(12) United States Patent
El-Yousofi et al.

(10) Patent No.: US 11,872,798 B2
(45) Date of Patent: Jan. 16, 2024

(54) NONWOVEN FABRIC FOR ACOUSTIC ISOLATION APPLICATIONS

(71) Applicant: FIBERTEX NONWOVENS A/S, Aalborg (DK)

(72) Inventors: Ali El-Yousofi, Angers (FR); Lars Bjerg Heskjaer, Aabybro (DK)

(73) Assignee: FIBERTEX NONWOVENS A/S, Aalborg Ost (DK)

( * ) Notice: Subject to any disclaimer, the term of this patent is extended or adjusted under 35 U.S.C. 154(b) by 741 days.

(21) Appl. No.: 16/976,092

(22) PCT Filed: Jan. 29, 2019

(86) PCT No.: PCT/EP2019/052089
§ 371 (c)(1),
(2) Date: Aug. 27, 2020

(87) PCT Pub. No.: WO2019/166167
PCT Pub. Date: Sep. 6, 2019

(65) Prior Publication Data
US 2020/0398525 A1    Dec. 24, 2020

(30) Foreign Application Priority Data
Mar. 2, 2018  (DE) .................... 10 2018 104 832.7

(51) Int. Cl.
*B32B 5/26* (2006.01)
*B32B 5/02* (2006.01)
(Continued)

(52) U.S. Cl.
CPC ............... *B32B 5/26* (2013.01); *B32B 5/022* (2013.01); *B32B 5/06* (2013.01); *D04H 1/43835* (2020.05);
(Continued)

(58) Field of Classification Search
CPC ...... D04H 1/498; D04H 1/4374; D04H 1/492; D04H 1/43838; D04H 1/43835;
(Continued)

(56) References Cited

U.S. PATENT DOCUMENTS

| 5,712,017 A * | 1/1998 | Jordan | B32B 27/06 |
| | | | 428/113 |
| 2007/0151800 A1 * | 7/2007 | Olson | B32B 5/08 |
| | | | 181/290 |

(Continued)

FOREIGN PATENT DOCUMENTS

| EP | 2348146 A1 | 7/2011 |
| WO | 2009126793 A1 | 10/2009 |

OTHER PUBLICATIONS

International Search Report and Written Opinion issued in corresponding International Patent Application No. PCT/EP2019/052089 dated Apr. 5, 2019 (11 pages).
(Continued)

*Primary Examiner* — Forrest M Phillips
(74) *Attorney, Agent, or Firm* — Kilyk & Bowersox, P.L.L.C.

(57) ABSTRACT

The invention relates to a method for manufacturing a nonwoven fabric having an air permeability of 2000 l/m²/s or less when measured at a pressure difference of 200 Pa according to EN ISO 9237, the method comprising the steps of: providing at least two sets of fibers, wherein a first fiber set comprises a significant level of splittable fibers and a second fiber set comprises a low level of splittable fibers or no splittable fibers; using the first fiber set to form at least one first fibrous web in a first web formation process and using the second fiber set to form at least one second fibrous web in a second web formation process; stacking the first and second webs so obtained to provide a multilayer web including two distinct layers of fibrous webs; and bonding
(Continued)

Figure 1:
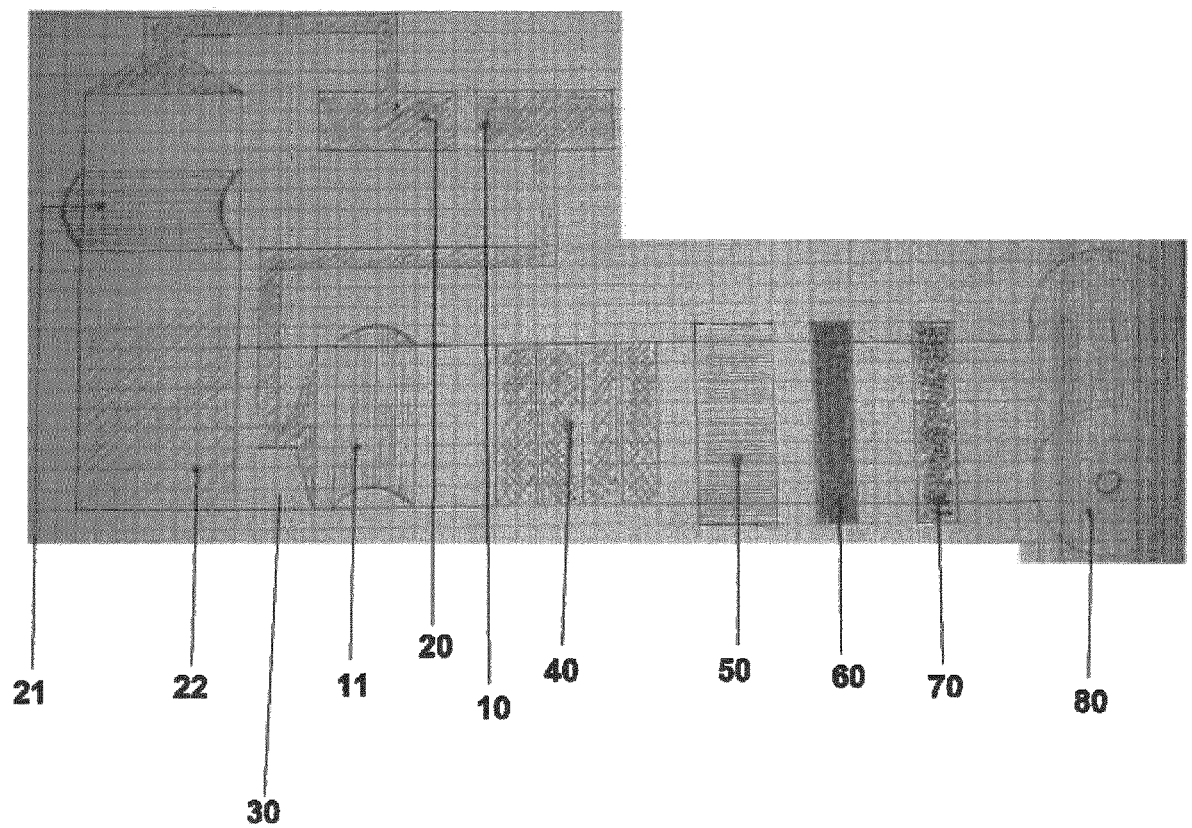

the multilayer web. The invention further relates to a nonwoven fabric obtainable by such process and the use of such nonwoven fabric in acoustic isolation applications.

20 Claims, 4 Drawing Sheets

(51) Int. Cl.
  *B32B 5/06* (2006.01)
  *D04H 1/4382* (2012.01)
  *D04H 1/4374* (2012.01)
  *D04H 1/492* (2012.01)
  *D04H 1/498* (2012.01)
(52) U.S. Cl.
  CPC ...... *D04H 1/43838* (2020.05); *B32B 2250/20* (2013.01); *B32B 2307/102* (2013.01); *B32B 2307/3065* (2013.01); *B32B 2307/738* (2013.01); *D04H 1/4374* (2013.01); *D04H 1/492* (2013.01); *D04H 1/498* (2013.01)
(58) Field of Classification Search
  CPC ...... B32B 2307/3065; B32B 2307/102; B32B 2307/738; B32B 2250/20; B32B 5/06; B32B 5/26
  See application file for complete search history.

(56) References Cited

U.S. PATENT DOCUMENTS

| | | | |
|---|---|---|---|
| 2012/0196108 A1* | 8/2012 | Bhatnagar | B32B 7/12 428/221 |
| 2019/0010640 A1* | 1/2019 | Rutsch | D04H 1/498 |
| 2023/0141900 A1* | 5/2023 | Hansen | C08L 23/16 424/443 |
| 2023/0173792 A1* | 6/2023 | Christopherson | B32B 27/08 428/336 |

OTHER PUBLICATIONS

International Preliminary Report on Patentability issued in corresponding International Patent Application No. PCT/EP2019/052089 dated Jun. 25, 2020 (8 pages).

* cited by examiner

NONWOVEN FABRIC FOR ACOUSTIC ISOLATION APPLICATIONS

This application is a National Stage Application of PCT/EP2019/052089, filed Jan. 29, 2019, which claims priority to German Patent Application No. 10 2018 104 832.7, filed Mar. 2, 2018.

The invention relates to a method for manufacturing a nonwoven fabric. The invention also relates to a nonwoven fabric and the use of such nonwoven fabric in acoustic isolation applications.

It is known in the prior art to employ nonwoven fabrics as functional element in soundproofing components such as soundproofing cladding elements for automotive applications. Useful positions to place such elements in an automobile comprise, for example, the inner surfaces of the engine compartment like the inside of the bonnet to absorb noise emissions of the engine.

In general, the nonwoven fabric thereby forms part of a so-called acoustic package, where the nonwoven is placed on top of a damping material such as acoustic absorbing foam material. When a soundwave hits the acoustic package, it is partly reflected and partly travels through the nonwoven and enters the damping material behind, where it is modified with regard to direction, amplitude and frequency before hitting a hard surface below the damping material. The hard surface can be part of the soundproofing component but is mostly a covered part, such as, e. g., a car bonnet. At the hard surface the modified and damped soundwave is reflected back through the damping material. To the most part, the share of the soundwave originally passing through the nonwoven hence becomes trapped between the hard surface and the inner surface of the nonwoven. It oscillated in this area that is filled with the damping material and is steadily weakened deadened. The nonwoven further weakens the soundwave by a so-called membrane effect, where the energy of the soundwaves is converted to vibrational energy in the nonwoven fabric sheet.

One decisive factor for the performance of nonwovens in such applications is their air permeability. Air permeabilities of 1500 $l/m^2/s$ or less when measured at a pressure difference of 200 Pa must be considered as a minimum requirement. Optimal values range between 100 and 1000 $l/m^2/s$ when measured at a pressure difference of 200 Pa. A higher air permeability would result in little trapping and necessitates thicker layers of damping material for effective soundproofing. A lower air permeability would result in too much reflection from the surface and the mechanism described above would not work effectively. New environmental constraints force car manufacturers to reduce weight of the cars and hence suppliers to reduce weight of the acoustic package. As damping materials are the heaviest parts in acoustic packages, decreasing its thickness is a priority. Using nonwoven fabrics with optimal air permeability is hence crucial.

However, air permeability is not the only demand that has to be met by nonwoven fabrics suitable for such applications. Specifically, the nonwovens also have to exhibit certain mechanical properties for shaping. Usually, when manufacturing acoustic packages, the nonwoven fabric is placed on the damping material and fabric and damping material are then joined and shaped in a thermoforming operation. It therefore has to be flexible enough so it can follow the 3D shaping of the elements. Also, an acceptable aesthetic appearance of the surface can be desired when the soundproofing component is intended for use at a visible position.

Conceivably, while it is in most cases rather easy to optimize one of the parameters on its own, it is tricky to get excellent properties in every respect at the same time.

State of the art products use monolayer nonwoven fabrics. Some of these products excel in different areas, but usually fail or are insufficient in others. An example could be a product that has good shaping and aspect abilities together with added functions given by impregnation, but fails to reach the low air permeability for optimal acoustics. Another example could be a product that has the right air permeability to give the optimal acoustics but are too stiff and strong to shape and cut properly and/or have an undesired appearance.

The invention aims to provide a nonwoven fabric that does not suffer from compromises but can have excellent properties with regard to all demands of acoustic isolation applications. The invention also aims to provide a method for easy and economical manufacture of such nonwoven.

Against this background, the invention provides for a method for manufacturing a nonwoven fabric having an air permeability of 1500 $l/m^2/s$ or less when measured at a pressure difference of 200 Pa according to EN ISO 9237, the method comprising the steps of: providing at least two sets of fibers, wherein a first fiber set comprises a significant level of splittable fibers and a second fiber set comprises a low level of splittable fibers or no splittable fibers; using the first fiber set to form at least one first fibrous web in a first web formation process and using the second fiber set to form at least one second fibrous web in a second web formation process; stacking the first and second webs so obtained to provide a multilayer web including two distinct layers of fibrous webs; and bonding the multilayer web.

The method enables formation of a two layer fabric having a functionality profile that is specifically desired in acoustic isolation applications in one single operation. The layer going back to the first web and comprising the splittable fibers, eventually split filaments, is very dense and leads to very low air permeability of the fabric. The layer going back to the second web and comprising the normal fibers accounts for desirable mechanical properties of the fabric.

The nonwoven fabric has an air permeability of 2000 $l/m^2/s$ or less when measured at a pressure difference of 200 Pa according to EN ISO 9237. In more preferred embodiments, the nonwoven fabric has an air permeability of 1000 $l/m^2/s$ or less or even 900 $l/m^2/s$ or less. In a specifically preferred embodiment, the nonwoven fabric may have an air permeability of between 100 and 1000 $l/m^2/s$ or between 150 and 900 $l/m^2/s$ when measured at a pressure difference of 200 Pa according to EN ISO 9237. Such air permeability leads to optimal performance in acoustic isolation applications. The relatively low air permeability can be observed due to the layer going back to the first web comprising the filaments resulting from splitting of the splittable fibers. The air permeability can optionally further be modulated by impregnation with particles, by adding nanofibers and the like, as described in the following.

The low air permeabilities are specific to nonwoven fabrics for use in acoustic isolation applications, whereas nonwoven fabrics usually used in hygiene applications as part of diapers, wet wipes, surgical drapes etc. have much higher air permeabilities of beyond 2000 $l/m^2/s$.

Splittable fibers are known in the art. They are multicomponent fibers that comprise multiple zones of incompatible polymers along their cross-section. The incompatible polymers are incompatible in a sense that they do not form a miscible blend when the melt is blended. When such fibers are subjected to mechanical impact, they split into smaller filaments along zone boundaries. The pairs have to be balanced for adhesive and dissociative behaviour to obtain fibers that split readily but also not prematurely. Examples of pairs of incompatible polymers useful herein include polyolefin-polyamide, polyolefin-polyester, and polyamide-polyester. A preferred combination herein is polyethylene terephthalate (PET) and polyamide (PA). Examples of cross-sectional profiles of splittable fibers useful herein include tipped fibers where one polymer is placed on the tips of a trilobal or delta cross-section core of the other polymer, or segmented ribbon fibers.

A significant level of splittable fibers in the first fiber set is to be understood in the sense that at least 30 wt.-% of the fibers of the first fiber set are splittable. Preferably, at least 50 wt.-%, more preferably at least 75 wt.-% and yet more preferably at least 90 wt.-% of the fibers of the first fiber set are splittable. In a most preferred embodiment, the first fiber set consists of splittable fibers. The splittable fibers can all be of the same type or there can be different types of splittable fibers.

A low level of splittable fibers in the second fiber set is to be understood in the sense that less than 20 wt.-% of the fibers of the second fiber set are splittable. Preferably, less than 10 wt.-% and more preferably less than 5 wt.-% of the fibers of the second fiber set are splittable. In a most preferred embodiment, the second fiber set is devoid of splittable fibers. The non-splittable, normal fibers that account for all or at least the majority of the fibers of the second fiber set can all be of the same type or there can be different types of normal fibers.

In a preferred embodiment, at least one and more preferably both sets of fibers are sets of staple fibers. In this embodiment, the average cut length of the staple fibers used in the first and/or the second fiber sets may be between 20 and 60 mm. Preferred ranges are between 30 and 40 mm. The linear mass density of the staple fibers used in the first and/or the second fiber sets may be between 0.1 and 4 dTex. For example, the linear mass density could be between 1 and 4 dTex.

In one variant of the invention, at least one of the sets of fibers, preferably the first set of fibers further comprises nanofibers. The addition of nanofibers may further reduce air permeability. Nanofibers are fibers having diameters of less than 1 μm and hence in the nanometer range. Preferably, nanofibers having diameters of less than 500 nm and more preferably of less than 200 nm are used. This is smaller than minimum dimensions of around 2-3 μm that can usually be obtained for filaments of the splittable fibers after splitting.

In one embodiment, the nonwoven is formed continuously and wherein the method involves continuously forming and stacking the webs on a moving conveyor belt, on which the multilayer web is continuously bonded. This enables an efficient large-scale production of the respective nonwovens.

While preferably being randomly oriented when looking at each individual fiber, usually the fibers in each of the webs adopt an average direction in the plane of the webs. In a preferred embodiment, the webs are laid/stacked such that the fibers within each of the layers have different average directions in the plane of the nonwoven fabric. This enhances mechanical strength and moldability of the fabric. For the same reason, it is usually undesired in nonwoven fabrics used in hygiene applications as part of diapers, wet wipes, surgical drapes etc. where softness is a decisive factor.

In one embodiment, at least one and preferably both web formation processes are carding processes in which the respective staple fibers are carded to provide the respective fibrous webs. In such process, the webs are formed by carding prior stacking and preferably laying on the conveyor belt. Carding leads to uniform webs having fibers that are, on average, aligned in a direction. Such webs are ideal for the purpose of the present invention.

Alternatively or additionally, it is possible to spin and lay continuous fibers to provide the respective fibrous webs.

In one embodiment the first and the second web are laid on a conveyor belt and thus combined and stacked on the conveyor belt prior entanglement. In a preferred embodiment, the webs are laid in different orientations. For example, one web may be laid on a conveyor belt in machine direction and the other web may be cross laid.

In one embodiment, the bonding comprises entangling the fibers of the multilayer web. Spunlacing, where high pressure fluid jets are directed to the multilayer web to entangle the fibers are specifically preferred. Generally, bonding processes most useful in this invention may use needles (needle-punching) or high pressure fluid jets (spunlacing) to entangle the fibers. These processes are preferred in the present two-layer setting due to their ability to interentangle fibers from different layers. Spunlacing is specifically preferred because the high pressure fluid jets not only entangle the fibers but also split the splittable fibers into smaller filaments. The fluid used is commonly water. In the interest of effective fiber splitting, the jets are preferably directed to the surface of the multilayer web which is constituted by the first web. Preferably fluid jet pressures for use in the inventive process are between 120 and 450 bar. When spunlacing is used for bonding, the method preferably comprises a drying step after the bonding.

In one embodiment, the method further comprises a step of thermomechanical processing, preferably calendering the bonded multilayer web to facilitate compression of the fabric to a desired level of thickness, mechanical stiffness and air permeability. During calendering, the multilayer web is passed between calender rollers at temperatures and pressures suitable to facilitate the above-rendered effects.

In one embodiment, the method further comprises a step of impregnating the bonded multilayer web. The impregnation can be carried out prior or after the thermomechanical processing step. Impregnating can comprise, for example, adding a binder to stiffen and fixate the nonwoven fabric. The impregnation can also comprise adding suitable agents to confer required properties such as flame retardant or oil- and water repellent properties to the nonwoven fabric. Correspondingly, flame retardants and/or oil- and water-repellent agents may be added during impregnation.

In one embodiment, the impregnating further comprises adding filler particles to the bonded multilayer web to lower air permeability. The particulate filler material may be impregnated to the multilayer web in the form of a gaseous or, preferably, liquid particle suspension. Suitable filler particles can have an average particle size of smaller 20 μm.

Preferably, the method further comprises drying the impregnated multilayer web.

In one embodiment, the method further comprises a step of application of an adhesive to one surface of the multilayer web/nonwoven fabric. This is preferably done after impregnation and possibly drying. A layer of adhesive makes it easy to attach the fabric to a substrate during the manufacture of acoustic isolation parts, for example, in a thermoforming process.

Generally, extra layers are added to the nonwoven fabric in-line or in a second step. Besides impregnation and deposition of adhesive, adding extra layers can involve microporous coating, deposition of nanofibers, and the like.

In one embodiment, the nonwoven fabric is finally rolled up for transportation purposes. After a predetermined length of nonwoven has been rolled up, the nonwoven can be cut in cross-machine direction and the roll wrapped for transportation purposes.

The invention further provides for a nonwoven fabric, preferably obtained by a method of the invention, wherein the fabric has an air permeability of 1500 l/m$^2$/s or less when measured at a pressure difference of 200 Pa according to EN ISO 9237 and comprises at least two distinct layers of nonwoven fiber webs, wherein a first web comprises a significant level of splittable fibers and a second web comprises a low level of splittable fibers or no splittable fibers, and wherein the splittable fibers of the first web are at least partially split into small filaments.

The layers are preferably arranged directly adjacent to each other without any intermediate layer or glue interface. Such configuration results when the fabric is manufactured in agreement with the inventive method. It is also conceivable, however, to first individually produce the layers and connect them afterwards.

Regarding preferred air permeabilities, variants of fiber sets and fibers as such, impregnations and possible additives, reference can be made to the description of the inventive process.

In one embodiment, the nonwoven fabrics have an overall thickness of 0.1 to 1 mm when measured under a pressure of 1 kPa. Preferred values comprise ranges between 0.2 and 0.6 mm, for example, 0.5 mm. In one embodiment, the layer going back to the second web accounts for more than half and preferably for more than two thirds of the overall thickness. The final thickness may have been adjusted by thermomechanical processing, preferably calendering.

In one embodiment, the nonwoven fabrics have an area weight of 20 to 150 g/m$^2$. Preferred values comprise ranges between 50 to 120 g/m$^2$, for example, 100 g/m$^2$. In one embodiment, the layer going back to the second web accounts for more than half and preferably for more than two thirds of the overall area weight.

In one embodiment, the nonwoven fabrics have a tensile strength in machine direction (TSMD) of 100 to 400 and preferably 200 to 300 N/50 mm when measured according to WSP 110.4. The tensile strength in cross-machine direction (TSCD) may be from 50 to 250 and preferably 100 to 200 N/50 mm when measured according to WSP 110.4.

In one embodiment, the nonwoven fabrics have a tensile elongation in machine direction (TEMD) of 15 to 40 and preferably 20 to 35% when measured according to WSP 110.4. The tensile strength in cross-machine direction (TSCD) may be from 60 to 100 and preferably 70 to 90% when measured according to WSP 110.4.

Additionally, the invention provides for the use of a nonwoven fabric of the invention in acoustic isolation applications, preferably automotive acoustic isolation applications. The nonwoven fabric may thereby be used as part of an acoustic package, wherein it is placed on a substrate, preferably with the surface constituted by the first web facing the substrate, and wherein fabric and substrate are then joined and shaped in a thermoforming operation. The substrate can, for example, be an acoustic absorbing foam plate. The thermoforming operation leads to a shaped soundproofing component that may be used, for example, as soundproofing cladding element for automotive applications. Useful positions to place such elements in an automobile comprise, for example, the inner surfaces of the engine compartment like the inside of the bonnet to absorb noise emissions of the engine.

To summarize, the two functional layers of the fabric of the invention complement each other to optimize all desired parameters at the same time, the layer going back to the first web give the acoustic performance through low air permeability and the layer going back to the second web layer to give the forming properties and visible aspect, such as black or anthracite color highly desired in automotive applications. Impregnation is used to add the other functionalities.

Figure 2:
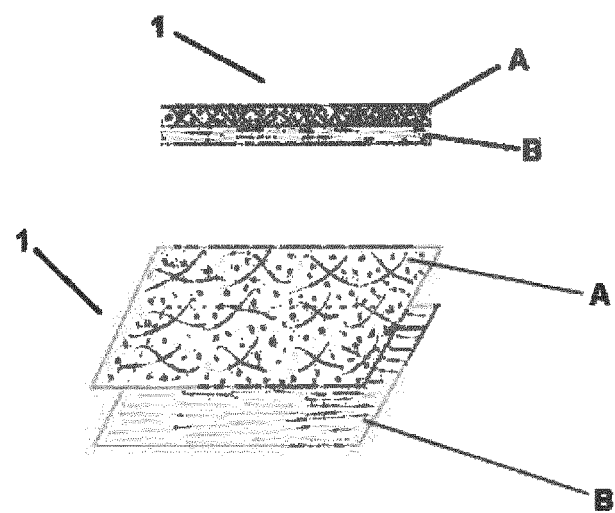
Figure 3:
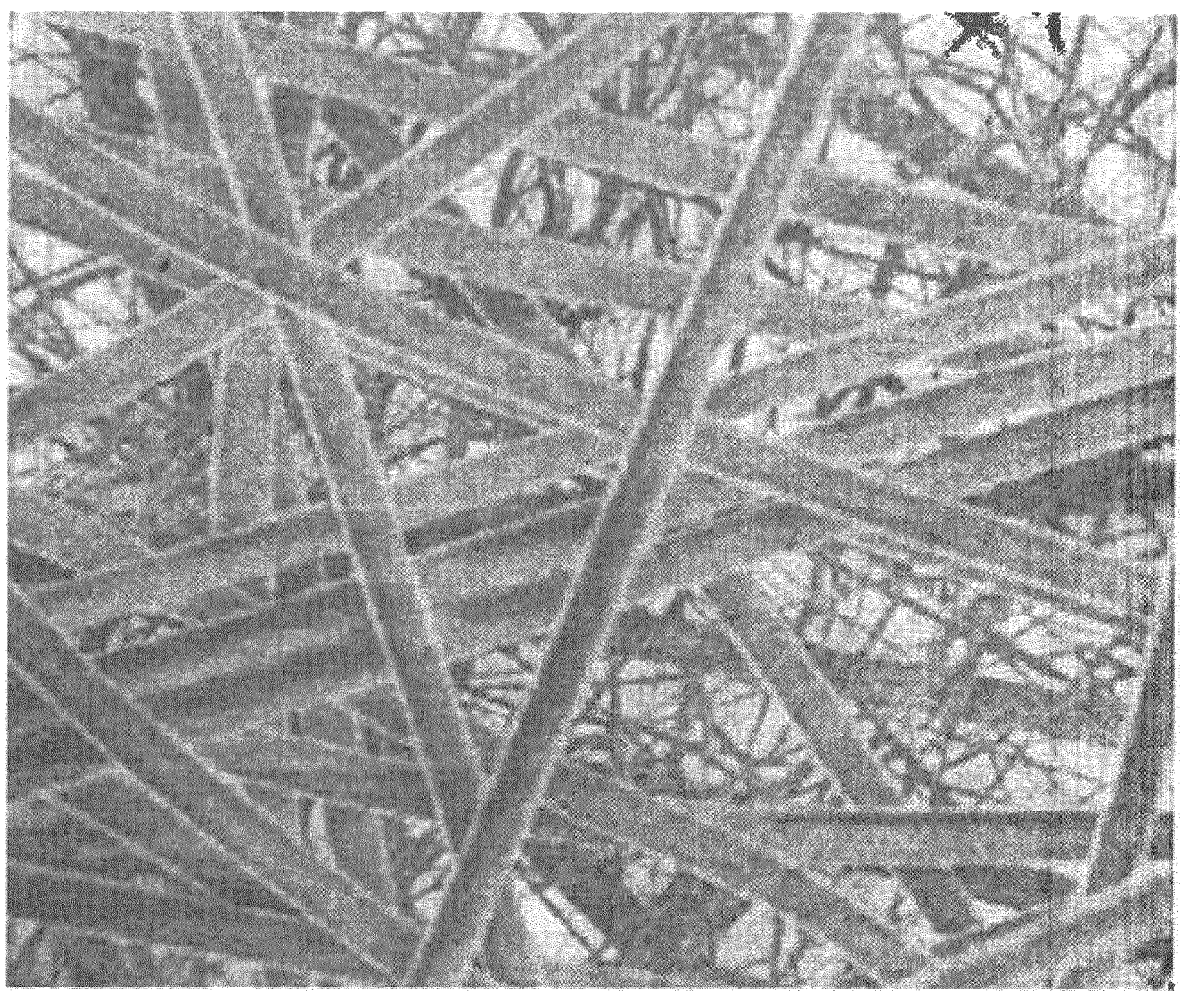
Figure 4:
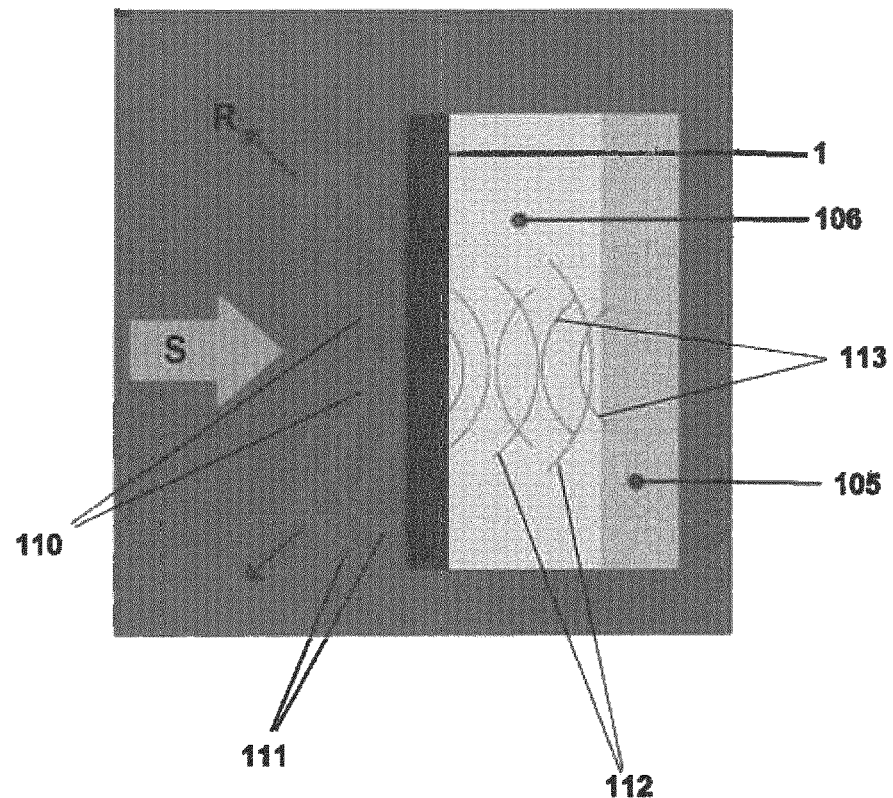
Figure 5:
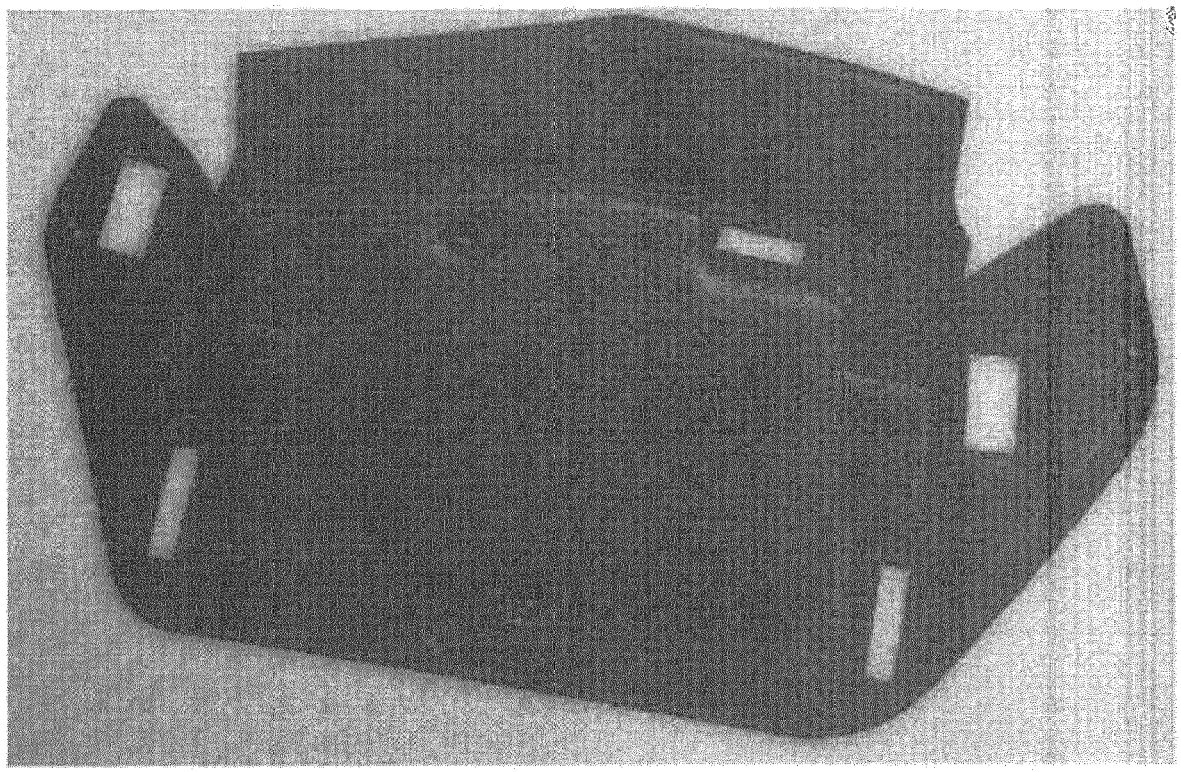
Figure 6:
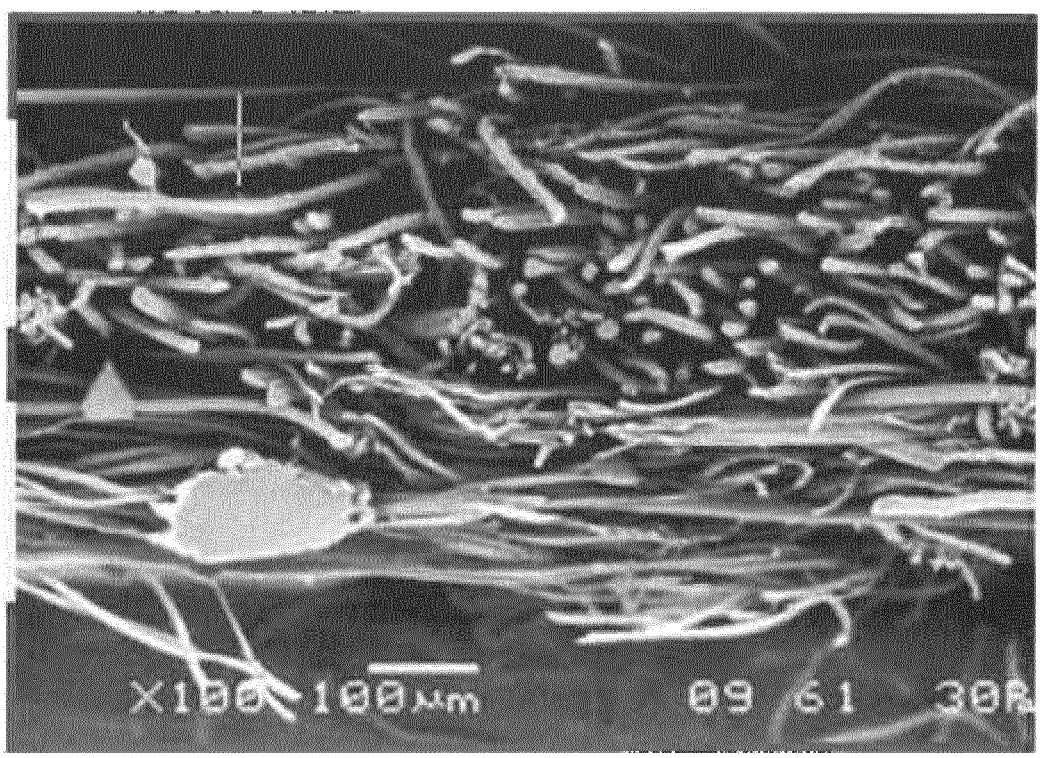

Further details and advantages of the invention will become apparent from the figures and examples described in the following. The figures show:

FIG. 1: a schematic illustration of a machine setup for manufacturing a nonwoven fabric in agreement with the method of the invention;

FIG. 2: a schematic illustration of a layered nonwoven fabric of the invention;

FIG. 3: a microscopic image of a fabric as shown in FIG. 2;

FIG. 4: a schematic illustration of the function of a layered nonwoven fabric of the invention within an acoustic package;

FIG. 5: a picture of a thermoformed cladding for acoustic isolation applications comprising a nonwoven fabric on top of a substrate;

FIG. 6: a microscopic picture of a layered nonwoven fabric manufactured in agreement with a concrete example described herein.

An exemplary machine setup for carrying out the method of the invention is illustrated in FIG. 1.

The machine comprises a first reservoir 10 with means for opening and mixing a first fiber set and a second reservoir 20 with means for opening and mixing a second fiber set. When carrying out the inventive method, the first reservoir 10 is filled with a first fiber set that comprises a significant level of splittable fibers and the second reservoir 20 is filled with a second fiber set that comprises none or a low level of splittable fibers.

The machine further comprises two carding machines. A first carding machine 11 is associated with the first reservoir 10 and functions to card the fibers of the first fiber set to provide a first fibrous web during a first carding process. A second carding machine 21 is associated with the second reservoir 20 and functions to card the fibers of the second fiber set to provide a second fibrous web during a second carding process.

A crosslapper 22 works to cross-lay the second fibrous web onto the conveyor belt 30 of the machine. The conveyor belt 30 moves to the right direction in the drawing and transports the cross-laid layer of the second fibrous web towards a point where the first fibrous web is parallel-laid on top.

The two layers, i.e., the cross-laid layer of the second fibrous web and the parallel-laid layer of the first fibrous web together form a multilayer web that is then transported further to the right direction in the drawing on the conveyor belt 30. It then passes spunlacing zones 40 where the fibers are mechanically interentangled by a plurality of small high pressure water jets. The water jets also function to split the splittable fibers within the layer going back to the first fibrous web into smaller filaments.

The nonwoven web thus formed is transported further on the conveyor belt 30 through drying zone 50, impregnation zone 60 and powdering zone 70. In the drying zone 50 an increased temperature is used to remove water that remains in the nonwoven after spunlacing. In the impregnation zone 60, a binder mixture is added to the nonwoven for stiffening and fixation as well as to confer flame retardant or oil- and water repellent properties. Additionally, filler particles can be added to the nonwoven to lower air permeability. Impregnation is carried out on the side of the nonwoven that goes back to the second fibrous web, i.e., the lower side on the drawing.

The product can go through thermomechanical processing, either in-line or offline before it goes into the powdering zone 70, adhesive is disposed on the surface of the nonwoven that goes back to the first fibrous web, i.e., the upper side on the drawing. This step can be done in-line, as shown, or alternatively also off-line.

The nonwoven is finally rolled up for transportation purposes at station 80.

FIG. 2 shows a schematic illustration of a layered nonwoven fabric 1 of the invention.

The fabric 1 can be produced on a machine as illustrated in FIG. 1. It comprises two distinct layers, an aspect side layer A and a function side layer B. The aspect side layer A is the layer that goes back to the second fibrous web of normal, non-splittable fibers. The function side layer B is the layer that goes back to the first fibrous web of splittable fibers. Little dots inside the aspect side layer A illustrate that this layer is impregnated, inter alia, with filler particles.

When used in acoustic packages, the fabric 1 is intended to be attached to a substrate having the function side layer B facing the substrate and the aspect side layer A being visible. The adhesive is disposed on the surface of the function side layer B aids to attach the fabric to the substrate during a thermoforming process. The binder impregnation of the aspect side layer A makes the outer side flame retardant and oil- and water-repellent.

FIG. 3 is a microscopic image of a fabric as schematically illustrated in FIG. 2.

FIG. 4 illustrates the function of such layered nonwoven fabric 1 of the invention within an acoustic package 100. The acoustic package 100 is comprised by a hard surface 105, which could be a car bonnet, a substrate 106 of acoustic absorbing foam and the layered nonwoven fabric 1 on top of the substrate 106.

The large arrow S illustrates the direction of incoming soundwaves 110. When the soundwaves 110 hit the nonwoven 1 on top of the acoustic package, it is partly reflected. The direction of the reflected soundwaves 111 is illustrated by arrow R. Another part 112 of the soundwave travels through the nonwoven and enters the substrate layer 106, where it is modified with regard to direction, amplitude and frequency before hitting the hard surface 105. At the hard surface the modified and damped soundwaves are reflected back and the soundwaves 113 thus reflected through the damping material. To the most part, the share 112 of the soundwave originally passing through the nonwoven hence becomes trapped between the hard surface 105 and the inner surface of the nonwoven 1. It oscillated in this area that is filled with the acoustic absorbing foam 106 and is steadily weakened deadened.

FIG. 5 shows a picture of a thermoformed cladding for acoustic isolation applications, comprising a nonwoven fabric on top of a substrate. The cladding can be mounted on a hard surface like the inside of a car bonnet to form an acoustic package as schematically illustrated in FIG. 4.

EXAMPLE 1

A nonwoven fabric as schematically illustrated in FIG. 2 is manufactured on a process line as schematically illustrated in FIG. 1.

The first fiber set consists of 100% splittable PET-PA fibers in 2.2 dTex and a cut length of between 28-51 mm that can split into 16 separate filaments. The second fiber set consists of a 70/30 mix between 1.7 dTex Viscose fibers with a cut length of 32-38 mm and a 1.3 dTex PET fiber with a cut length of 32-38 mm.

The resultant product is shown in the microscopic image of FIG. 6, where the loftier aspect side layer comprising the thicker fibers lies on top of the denser functional layer comprising the small filaments resulting from splitting of the splittable fibers.

Test Results:

The product has been tested for air permeability any yielded a value of 797 l/m$^2$/s when measured at a pressure difference of 200 Pa according to EN ISO 9237.

Four tests for tensile strength (TS) and elongation (TE) properties were carried out in each machine direction (MD) and cross-machine direction (CD) according to WSP 110.4. The results are shown in Tables 1 and 2 below.

TABLE 1

| | | Tensile Strength | | | | | |
|---|---|---|---|---|---|---|---|
| N° | | F (2.5%) N | F (5%) N | F (10%) N | F (20%) N | F (50%) N | F (Max) N |
| 1.1 | MD | 61.35 | 86.72 | 123.74 | 207.19 | — | 263.75 |
| 1.2 | | 69.99 | 95.78 | 135.09 | 227.77 | — | 282.69 |
| 1.3 | | 73.55 | 100.43 | 141.03 | 237.37 | — | 288.10 |
| 1.4 | | 66.97 | 92.10 | 129.52 | 214.74 | — | 264.42 |
| 2.1 | CD | 7.76 | 13.37 | 20.17 | 30.44 | 82.22 | 144.38 |
| 2.2 | | 9.87 | 17.19 | 24.82 | 36.94 | 95.11 | 147.32 |
| 2.3 | | 8.35 | 15.24 | 23.00 | 34.38 | 90.80 | 144.07 |
| 2.4 | | 9.60 | 16.75 | 24.50 | 36.24 | 97.74 | 149.21 |

TABLE 2

| | | Tensile Elongation | | | | | | |
|---|---|---|---|---|---|---|---|---|
| Nr | | All (5N) % | All (10N) % | All (20N) % | All (50N) % | All (100N) % | All (200N) % | All (Max) % |
| 1.1 | MD | 0.28 | 0.44 | 0.72 | 1.83 | 6.78 | 19.15 | 29.0 |
| 1.2 | | 0.18 | 0.31 | 0.55 | 1.46 | 5.53 | 17.07 | 28.0 |
| 1.3 | | 0.25 | 0.36 | 0.58 | 1.39 | 4.95 | 16.19 | 27.0 |
| 1.4 | | 0.16 | 0.30 | 0.57 | 1.56 | 6.04 | 18.29 | 28.0 |
| 2.1 | CD | 1.47 | 3.41 | 9.84 | 33.82 | 58.05 | — | 81.0 |
| 2.2 | | 1.24 | 2.53 | 6.50 | 28.51 | 52.09 | — | 76.0 |
| 2.3 | | 1.46 | 3.03 | 7.70 | 30.58 | 53.86 | — | 74.5 |
| 2.4 | | 1.23 | 2.62 | 6.71 | 29.14 | 52.16 | — | 75.0 |

As can be gathered, the average maximum tensile strength in machine direction (TSMD) was in the magnitude of 275 N/50 mm and the average maximum tensile strength in cross-machine direction (TSMD) was close to 150 N/50 mm. The average tensile elongation at break in machine direction (TSMD) was close to 30% and the average tensile elongation at break in cross-machine direction (TSMD) was close to 80%.

The invention claimed is:

1. A method for manufacturing a nonwoven fabric having an air permeability of between 100 and 1500 l/m$^2$/s when measured at a pressure difference of 200 Pa according to EN ISO 9237, the method comprising the steps of:
   providing at least two sets of fibers, wherein a first fiber set comprises at least 30 wt-% of splittable fibers and a second fiber set comprises less than 20 wt-% of splittable fibers or no splittable fibers;

using the first fiber set to form at least one first fibrous web in a first web formation process and using the second fiber set to form at least one second fibrous web in a second web formation process;

stacking the first and second webs so obtained to provide a multilayer web including two distinct layers of fibrous webs;

bonding together the multilayer web comprising the first and second webs, wherein the bonding comprises spunlacing to direct high pressure fluid jets to the multilayer web to at least partially split splittable fibers from the first web into small filaments and intertangle fibers from the first and second webs; and impregnating the bonded multilayer web, the impregnating comprising adding a binder to stiffen and fixate the nonwoven fabric and a flame retardant.

2. The method of claim 1, wherein the nonwoven fabric has an air permeability of between 100 and 1000 $l/m^2/s$, when measured at a pressure difference of 200 Pa according to EN ISO 9237.

3. The method of claim 1, wherein at least one of said first fiber set or said second fiber set are staple fibers.

4. The method of claim 1, wherein at least one of said first fiber set or said second fiber set further comprises nanofibers.

5. The method of claim 1, wherein the nonwoven is formed continuously and wherein the method involves continuously forming and stacking the webs on a moving conveyor belt, on which the multilayer web is continuously bonded.

6. The method of claim 1, wherein the webs are configured and oriented such that the fibers within each of the layers have different average directions in the plane of the nonwoven fabric.

7. The method of claim 3, wherein at least one of said first web formation process or said second web formation process is a carding process in which the respective said staple fibers are carded to provide the respective fibrous webs.

8. The method of claim 7, wherein the first fibrous web and the second fibrous web are laid on a conveyor belt in different orientations.

9. The method of claim 1, wherein the method further comprises thermomechanical processing the bonded multilayer web.

10. The method of claim 1, wherein the impregnating further comprises adding an oil- and water-repellent agent and/or particulate filler material.

11. The method of claim 1, wherein the method further comprises drying the multilayer web after said impregnating.

12. The method of claim 1, wherein the method further comprises adding an adhesive to at least one surface of the multilayer web.

13. A nonwoven fabric, wherein the fabric has an air permeability of between 100 and 1500 $l/m^2/s$ when measured at a pressure difference of 200 Pa according to EN ISO 9237 and comprises at least two distinct layers of nonwoven fiber webs, wherein a first web comprises at least 30 wt-% of splittable fibers and a second web comprises less than 20 wt-% of splittable fibers or no splittable fibers, wherein the splittable fibers of the first web are at least partially split into small filaments and wherein the fibers from the first and second fiber webs are interentangled, and wherein the fabric is impregnated with a binder that stiffens and fixates the fabric and with a flame retardant.

14. An acoustic isolation material that comprises the nonwoven fabric of claim 13.

15. The method of claim 1, wherein the nonwoven fabric has an air permeability of between 150 and 900 $l/m^2/s$ when measured at a pressure difference of 200 Pa according to EN ISO 9237.

16. The method of claim 1, wherein said first fiber set and said second fiber set are staple fibers.

17. The method of claim 1, wherein each of said first fiber set and said second fiber set further comprises nanofibers.

18. The method of claim 3, wherein said first web formation process and said second web formation process are each a carding process in which the respective said staple fibers are carded to provide the respective fibrous webs.

19. The method of claim 1, wherein the method further comprises calendering the bonded multilayer web.

20. The method of claim 1, wherein the method further comprises adding an adhesive to the surface of the multilayer web that goes back to the first fibrous web.

* * * * *